US008732617B1

(12) United States Patent
Armstrong et al.

(10) Patent No.: US 8,732,617 B1
(45) Date of Patent: May 20, 2014

(54) SYSTEMS AND METHODS FOR ENHANCED FUNCTION ACCESS IN MOBILE APPLICATIONS

(71) Applicants: Brian Armstrong, Cupertino, CA (US); Joshua Kaplan, San Francisco, CA (US)

(72) Inventors: Brian Armstrong, Cupertino, CA (US); Joshua Kaplan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/742,413

(22) Filed: Jan. 16, 2013

(51) Int. Cl.
*G06F 3/0482* (2013.01)
(52) U.S. Cl.
CPC .................................... *G06F 3/0482* (2013.01)
USPC ............ 715/835; 715/711; 715/765; 715/841
(58) Field of Classification Search
CPC ...................................................... G06F 3/0842
USPC .................................. 715/711, 765, 835, 841
See application file for complete search history.

(56) References Cited

U.S. PATENT DOCUMENTS

2009/0013275 A1* 1/2009 May et al. ...................... 715/765
2013/0019173 A1* 1/2013 Kotler et al. ................... 715/711

* cited by examiner

*Primary Examiner* — Andrey Belousov
(74) *Attorney, Agent, or Firm* — Troutman Sanders LLP; James E. Schutz; Mark L. Jones

(57) ABSTRACT

Certain implementations of the disclosed technology may include systems and methods for enhanced function access in mobile applications. According to an example implementation, a method is provided. The method includes outputting an application selection screen including one or more icons. The method includes receiving an indication of a first gesture input entered at a first location of a presence-sensitive display, the first location being associated with a first icon from the one or more icons. The method also includes outputting an indication of the one or more predefined functions of the application associated with the first icon, and responsive to a selection, executing the selected at least one of the one or more predefined functions without outputting the respective primary application user interface for the application associated with the first icon.

21 Claims, 5 Drawing Sheets

SYSTEMS AND METHODS FOR ENHANCED FUNCTION ACCESS IN MOBILE APPLICATIONS

BACKGROUND

The proliferation of mobile computing devices has fueled a rapid growth in the mobile application industry. A mobile application ("mobile app" or "app") is a software application designed to execute on a smartphone, tablet computing device, desktop or laptop computing device, and/or other type of mobile computing device (e.g., a smart watch). Many mobile apps were originally intended for certain limited-productivity activities, including email, calendaring, contact management, and other information management activities. Now, over a half-million targeted mobile applications can be downloaded directly to a mobile device and used for a wide variety of tasks and entertainment.

A typical user may install dozens of mobile apps on her mobile device, resulting in a home screen view that can quickly become crowded with app icons. The availability of multitasking allows several apps to run simultaneously, but when an app is selected for use, the full app may load in the display forefront and the associated graphics may take up all or part of the displayed view. This functionality may make it inconvenient to easily access, view, or utilize other apps or functions of the mobile device.

SUMMARY

Some or all of the above needs may be addressed by certain implementations of the disclosed technology. Certain implementations may include enhanced access to functions associated with a mobile application.

According to an example implementation, a method is provided. The method includes outputting, by a computing device, and for presentation, an application selection screen, the application selection screen including one or more icons, each icon associated with a respective application, each respective application associated with a respective primary application user interface for the respective application. The method also includes receiving, by the computing device, an indication of a first gesture input entered at a first location of a presence-sensitive display, the first location being associated with a first icon from the one or more icons, the first gesture input further associated with access to one or more predefined functions of the application associated with the first icon. Responsive to receiving the indication of the first gesture input, the method includes outputting, by the computing device and for presentation within the application selection screen, an indication of the one or more predefined functions of the application associated with the first icon. The method includes receiving, by the computing device, an indication of a second gesture input indicating a selection of at least one of the one or more predefined functions of the application associated with the first icon. Responsive to the selection, the method includes executing the selected at least one of the one or more predefined functions without outputting, for presentation, the respective primary application user interface for the application associated with the first icon.

In another example implementation of the disclosed technology, a system is provided. The system includes a presence-sensitive display, one or more processors in communication with the presence-sensitive display, and at least one memory in communication with the one or more processors and configured for storing data and instructions that, when executed by the at least one processor, cause the system to output, and for presentation, an application selection screen, the application selection screen including one or more icons, each icon associated with a respective application, each respective application associated with a respective primary application user interface for the respective application. When executed by the at least one processor, the instructions further cause the system to receive an indication of a first gesture input entered at a first location of a presence-sensitive display, the first location being associated with a first icon from the one or more icons, the first gesture input being associated with access to one or more predefined functions of the application associated with the first icon. Responsive to receiving the indication of the first gesture input, the system is configured to output, for presentation within the application selection screen, an indication of the one or more predefined functions of the application associated with the first icon. When executed by the at least one processor, the instructions further cause the system to receive an indication of a second gesture input indicating a selection of at least one of the one or more predefined functions of the application associated with the first icon, and responsive to the selection, the system is configured to execute the selected at least one of the one or more predefined functions without outputting, for presentation, the respective primary application user interface for the application associated with the first icon.

According to another example implementation, a non-transitory computer-readable medium is provided that stores instructions that, when executed by at least one processor in a system, cause the system to perform a method. The method includes outputting, by a computing device, and for presentation, an application selection screen, the application selection screen including one or more icons, each icon associated with a respective application, each respective application associated with a respective primary application user interface for the respective application. The method also includes receiving, by the computing device, an indication of a first gesture input entered at a first location of a presence-sensitive display, the first location being associated with a first icon from the one or more icons, the first gesture input further associated with access to one or more predefined functions of the application associated with the first icon. Responsive to receiving the indication of the first gesture input, the method includes outputting, by the computing device and for presentation within the application selection screen, an indication of the one or more predefined functions of the application associated with the first icon. The method includes receiving, by the computing device, an indication of a second gesture input indicating a selection of at least one of the one or more predefined functions of the application associated with the first icon. Responsive to the selection, the method includes executing the selected at least one of the one or more predefined functions without outputting, for presentation, the respective primary application user interface for the application associated with the first icon.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1A:
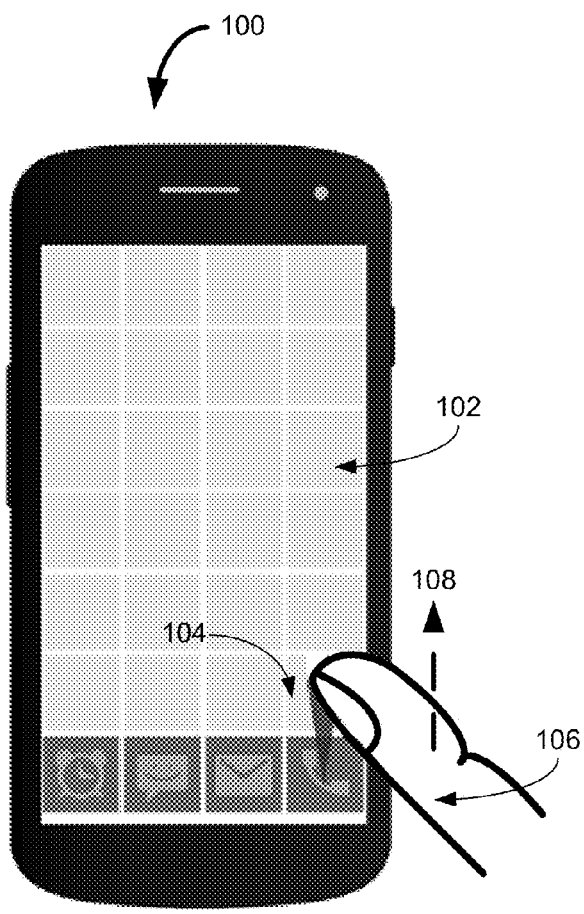
FIG. 1A is an example illustration of a mobile device 100, with mobile app icons displayed on an application selection screen 102.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Certain implementations of the disclosed technology may enable a user of a mobile device to access certain functions associated with a mobile app, for example, via detection of a simple gesture interaction with the mobile device. In certain example implementations, the functions may be accessed via one or more widgets. The term "widget" is a name associated with a generic type of software application that typically includes portable code intended for a specific function.

The mobile apps, as disclosed herein, may include one or more widgets, each widget associated with one or more functions associated with the app, and each widget may be able to launch and perform its given function independent of launching the full app. In certain example implementations, a gesture may be predefined and associated such that, upon detection, causes one or more predefined widgets associated with the app to launch or to be presented on a display for performing a function or for further selection. According to an example implementation of the disclosed technology, widgets may be presented in response to the detected gesture and displayed in a way that occupies only a portion of the display screen of the mobile device, in contrast to a mobile app that typically occupies the entire display screen upon launch. In this regard, and according to example implementations, screen clutter may be reduced and a clean grid of icons may be maintained while being able to access widgets and other functions of the mobile device without fully opening an application or using an embedded home screen widget.

According to one example implementation, widgets associated with a given application may be preconfigured for certain presentation on a display. For example, in one example implementation, swiping up (or alternatively, swiping down) on an icon may directly reveal or open a "widget drawer" without needing to open the app or leave the application selection screen.

Various implementations may be utilized for accessing and utilizing widgets or other mobile app functions, according to example implementations of the disclosed technology, and will now be described with reference to the accompanying figures.

FIG. 1A depicts an example illustration of a mobile device 100, with a plurality of mobile app icons depicted on a bottom portion of an application selection screen 102. The illustration also depicts an example gesture 108. In some implementations, a gesture may be utilized for communicating an intent, which may be interpreted by hardware and/or software systems to cause one or more actions. For example, in one example implementation, the gesture 108 may be provided by a user's finger or thumb 106. In an example implementation, a user may utilize gestures to first select the mobile app and then open a widget drawer associated with the selected mobile app. By way of an example, the gesture 108 depicted in FIG. 1A may include touching the surface of the mobile device 100 at a touch sensitive display near the desired application icon 104 for selection of a particular application. The gesture 108 may also include swiping the finger or thumb 106 to open the widget drawer associated with the selected application. In another example implementation, a presence-sensitive detector may be utilized to recognize hand gestures. Other gestures may include audible commands, proximity movements, facial gestures, etc. without departing from the scope of the disclosed technology.

Figure 1B:
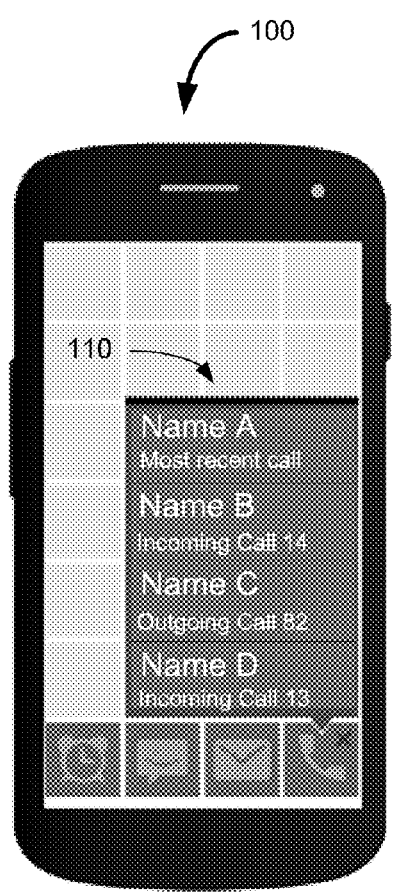
FIG. 1B is an example illustration of a mobile device 100, depicting functions 110 associated with a selected mobile app 104.

FIG. 1B depicts an example widget drawer 110 as it may be presented on a display associated with the mobile device 100. The widget drawer 110 may be displayed, for example, in response to the detected swipe gesture (as in the gesture 108 in FIG. 1A). In this example illustration, and according to certain example implementations, the widget drawer 110 may be associated with a selected mobile app (as in the mobile app 104 in FIG. 1A).

According to an example implementation, a widget drawer 110 may include one or more cells of data, one or more labels, one or more selectable regions, one or more widgets, one or more functions, etc. For example, and as depicted in FIG. 1B, the displayed widget locker 110 may include contact data associated with one or more communications interactions. In certain implementations, the items displayed in the widget locker 110 may be further selectable. For example, and as depicted in FIG. 1A, a recent caller may be selected for further communication interactions.

Figure 2A:
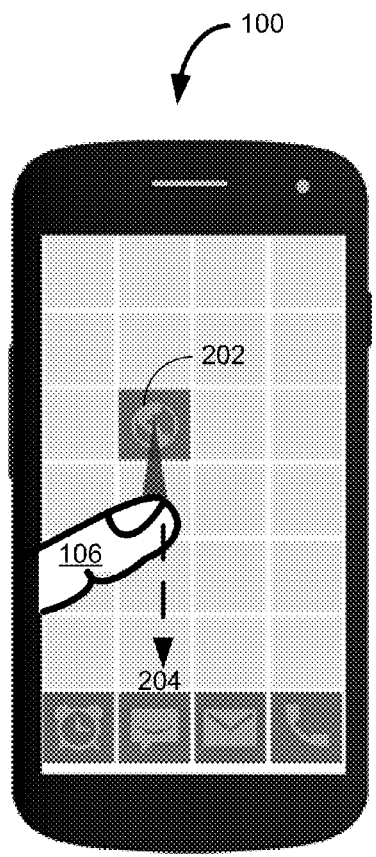
FIG. 2A is another example illustration of a mobile device 100, with another mobile app icon 202 displayed on an application selection screen.
Figure 2B:
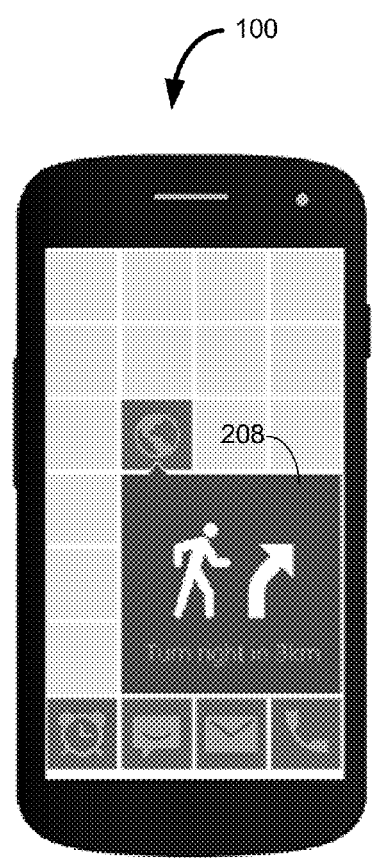
FIG. 2B is another example illustration of a mobile device 100, depicting a function 208 associated with the selected mobile app 202.

According to an example implementation, when opened by a gesture, the widget drawer 110 associated with a mobile app may display certain information associated with the mobile app. For example, FIG. 2A shows an example illustration of a mobile device 100, with a mobile app icon 202 on an application selection screen. Also shown is an example gesture 204 for accessing a widget drawer associated with the selected mobile app 202. FIG. 2B shows the information 208 displayed in the widget drawer associated with the selected mobile app 202, where the information 108 may be displayed in response to a detection of the gesture 204, according to an example implementation. For example, the widget drawer may be utilized to display the next turn instructions associated with a map program. Those skilled in the art will appreciate that this type of targeted information display (or function access) may provide an enhanced user experience, particularly since the user may receive pertinent information associated with a mobile app without the app taking up the entire display screen.

According to an example implementation, a grid view, application selection view, or home screen view may present one or more icons associated with one or more corresponding mobile apps. In an example implementation, the user may swipe up or down on an icon to open a drawer that contains a widget. In certain implementation, the widget slides out and snaps to the grid and overlays surrounding objects on the grid view, application selection view, or home screen view. According to an example implementation, a user may interact with a widget in the drawer without leaving the home screen or further interacting with the mobile app. In an example implementation, the user may swipe down or up to close the drawer containing the widget.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

Figure 3:
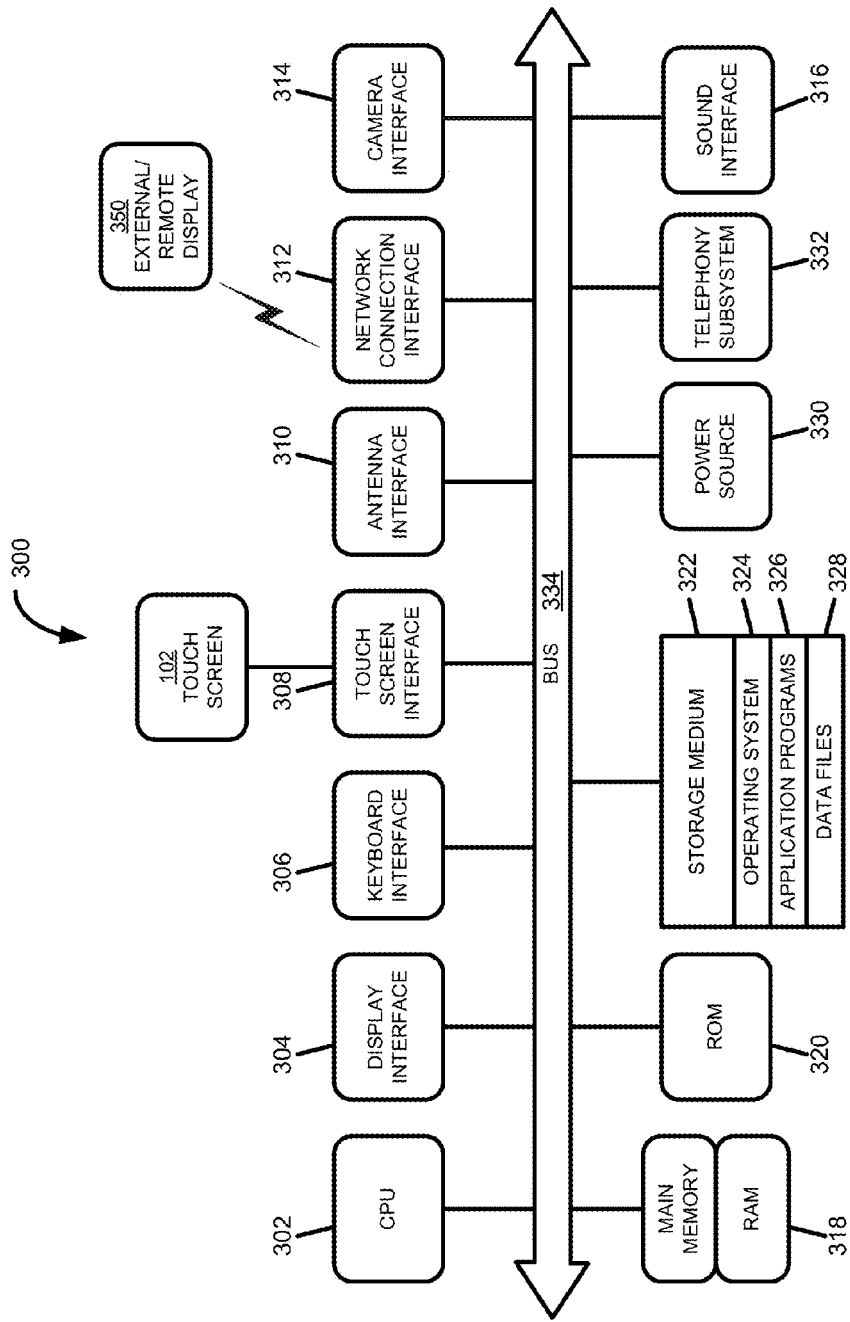
FIG. 3 is a block diagram of an illustrative mobile device computing system architecture, according to an example implementation.

FIG. 3 depicts a block diagram of an illustrative computer system architecture 300 according to an example implementation. Certain aspects of FIG. 3 may be embodied in the mobile device (for example, the mobile device 100 as shown in FIGS. 1A, 1B, 2A and 2B). Various implementations and methods herein may be embodied in non-transitory computer readable media for execution by a processor. It will be understood that the architecture 300 is provided for example purposes only and does not limit the scope of the various implementations of the communication systems and methods.

The architecture 300 of FIG. 3 includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile device. In another example implementation, the display interface 304 may be configured for providing data, images, and other information for an external/remote display 350 that is not necessarily connected to the mobile computing device. For example, a desktop monitor may be utilized for mirroring graphics and other information that is presented on a mobile device. In certain example implementations, the display interface 304 may wirelessly communicate, for example, via a Wi-Fi channel or other available network connection interface 312 to the external/remote display 350.

In an example implementation, the network connection interface 312 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 304 may be operatively coupled to a local display, such as a touch-screen display associated with a mobile device. In another example, the display interface 304 may be configured to provide video, graphics, images, text, other information, or any combination thereof for an external/remote display 350 that is not necessarily connected to the mobile computing device. In one example, a desktop monitor may be utilized for mirroring or extending graphical information that may be presented on a mobile device. In another example, the display interface 304 may wirelessly communicate, for example, via the network connection interface 312 such as a Wi-Fi transceiver to the external/remote display 350.

The architecture 300 may include a keyboard interface 306 that provides a communication interface to a keyboard; and a pointing device interface 308 that provides a communication interface to a pointing device or touch screen. Example implementations of the architecture 300 may include an antenna interface 310 that provides a communication interface to an antenna; a network connection interface 312 that provides a communication interface to a network. As mentioned above, the display interface 304 may be in communication with the network connection interface 312, for example, to provide information for display on a remote display 350 that is not directly connected or attached to the system. In certain implementations, a camera interface 314 is provided that acts as a communication interface and provides functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the architecture 300 includes a read-only memory (ROM) 320 where invariant low-level system code or data for basic system functions such as basic input and output (I/O), startup, or reception of keystrokes from a keyboard are stored in a non-volatile memory device. According to an example implementation, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an example implementation, the architecture 300 includes a power source 330 that provides an appropriate alternating current (AC) or direct current (DC) to power components. According to an example implementation, the architecture 300 includes and a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the term computing device, as used herein, may be a CPU, or conceptualized as a CPU (for example, the CPU 302 of FIG. 3). In this example implementation, the computing device (CPU) may be coupled, connected, and/or in communication with one or more peripheral devices, such as display. In another example implementation, the term computing device, as used herein, may refer to a mobile computing device, such as a smartphone or tablet computer. In this example embodiment, the computing device may output content to its local display and/or speaker(s). In another example implementation, the computing device may output content to an external display device (e.g., over Wi-Fi) such as a TV or an external computing system.

Figure 4:
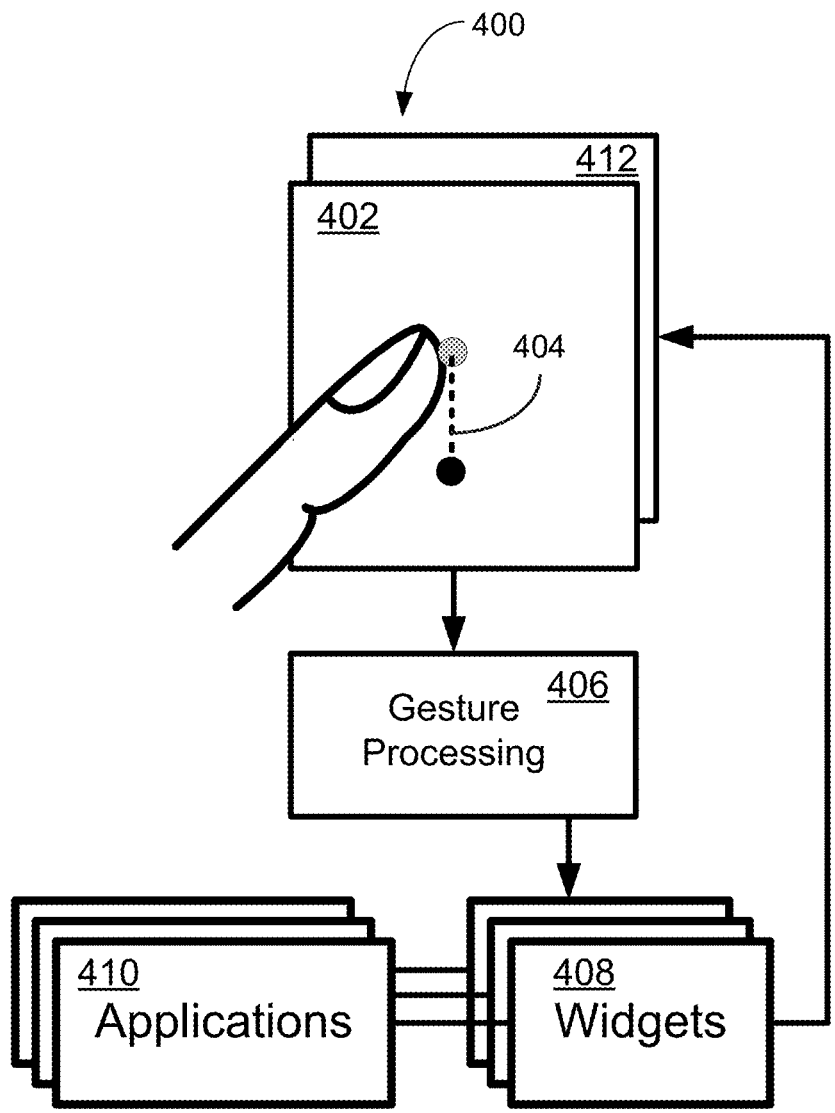
FIG. 4 is a block diagram of illustrative system functions for recognizing gestures 404 and accessing widgets 408 associated with particular selected applications 410, according to an example implementation.

FIG. 4 depicts a block diagram, according to an example implementation of the disclosed technology, for accessing one or more widgets 408 associated with corresponding applications 410. In an example implementation, a presence-sensitive interface 402 may detect a gesture 404, where at least part of the gesture 404 corresponds to a position of an icon. For example, an initial touch on a touch screen surface within a predefined boundary may be interpreted as selecting a particular mobile app. According to an example implementation, the remaining portion of the gesture may be utilized and interpreted by the gesture processing block 406 as a command for opening the widget drawer for display of the widgets 408 associated with the corresponding selected application 410. According to certain implementations, a display screen 412 may be utilized for presenting the images to the user. In one implementation, the display screen 412 may be integrated with the presence-sensitive interface 402. In another implementation, the presence-sensitive interface 402 may be physically separated from the display screen 412. In another example implementation, an external or remote monitor (for example, the external/remote display 350 as depicted in FIG. 3) may be utilized for mirroring certain data and images. In certain example implementations, the remote monitor may be utilized for displaying certain content that is not necessarily the same as that being presented on the display screen 412. According to certain example embodiments, the presence-sensitive interface 402 may be associated with a mobile computing device, and the mobile computing device may be configured to act as a remote control for controlling certain aspects and/or of an external or remote display/monitor (for example, the external/remote display 350 as depicted in FIG. 3). For example, the presence-sensitive interface 402 may be utilized to detect a gesture 404 or other user input for remote control of an external or remote display/monitor.

In accordance with certain example implementations, the visual presentation (size, shape, color, etc.) of the items (i.e., cells of data, one or more labels, one or more selectable regions, one or more widgets, one or more functions, etc.) within the widget drawer may be controlled by a particular mobile app, and such visual presentation options may be available for control by the mobile app developer. In other implementations, the visual presentation of the items in the widget drawer may follow default rules. For example, upon opening a widget drawer associated with an application, the items within the widget drawer may each be displayed according to a predefined grid. In certain example implementations, the size of the widget drawer may be dependent on the contents of the item(s) or on the number of items within the widget drawer. In another example implementation, the relevance of the items in the widget drawer may be utilized for determining which items are displayed. According to another example implementation, items in the widget drawer may be reviewed and selected, for example, by a swiping gesture to scroll through the items when there are too many items to display clearly at one time. According to certain example implementations, the display, arrangement, functionality, etc., of items in the widget drawer may be based, at least in part, on habits of the user, a time of day, and/or other factors.

In one example implementation, a communications mobile app (such as e-mail or SMS) may include a widget to display messages. Another widget associated with the app may allow the user to compose a quick reply without needing to open the entire app. Implementations of the disclosed technology may allow the user to do a quick interaction with an application without needing to leave the home screen environment.

Figure 5:
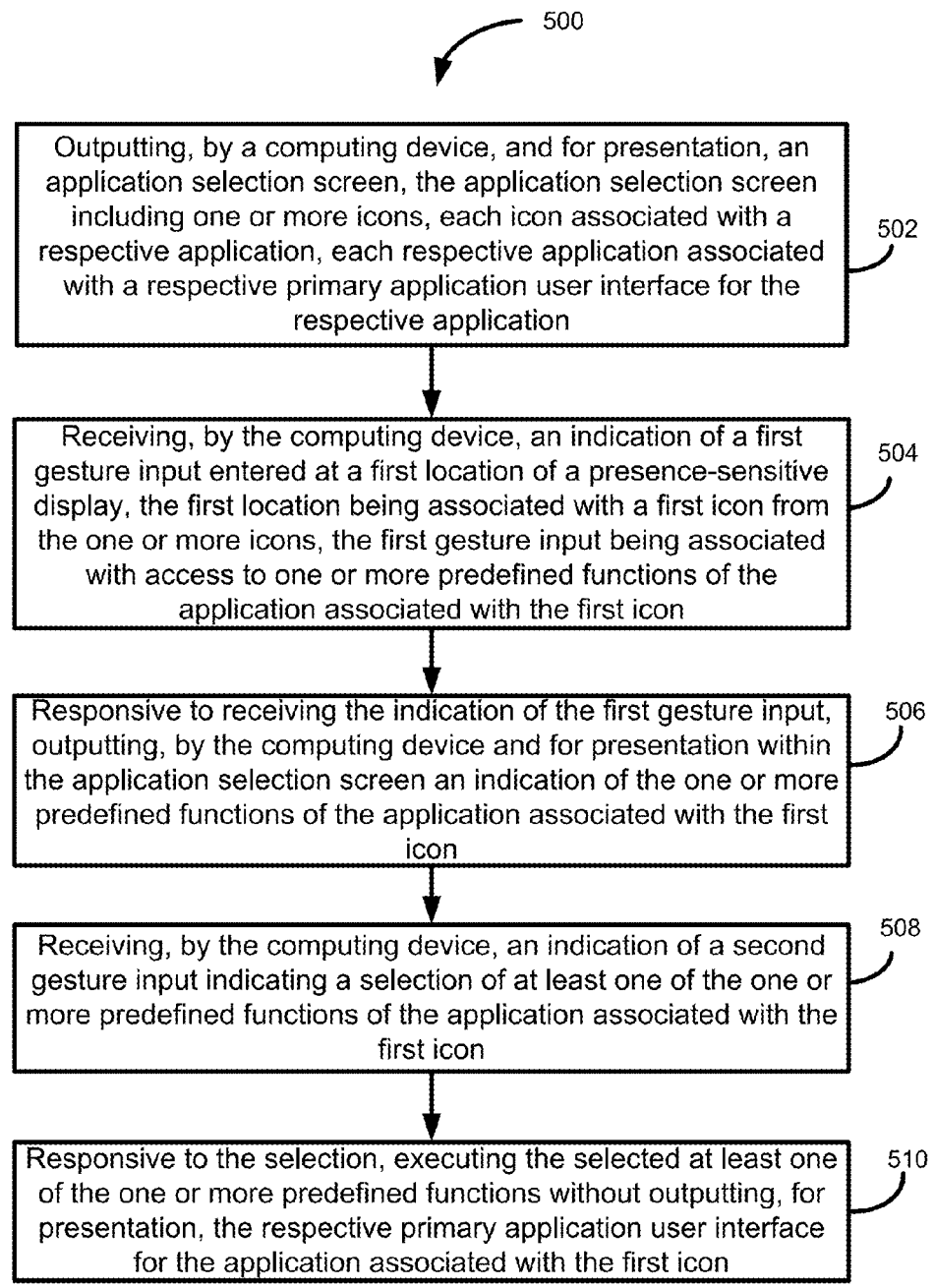
FIG. 5 is a flow diagram of a method according to an example implementation.

An example method 500 for accessing widgets will now be described with reference to the flowchart of FIG. 5. The method 500 starts in block 502, and according to an example implementation includes outputting, by a computing device and for presentation, an application selection screen, the application selection screen including one or more icons, each icon associated with a respective application, each respective application associated with a respective primary application user interface for the respective application. In block 504, the method 500 includes receiving, by the computing device, an indication of a first gesture input entered at a first location of a presence-sensitive display, the first location being associated with a first icon from the one or more icons, the first gesture input being associated with access to one or more predefined functions of the application associated with the first icon. In block 506, the method 500 includes, responsive to receiving the indication of the first gesture input, outputting, by the computing device and for presentation within the application selection screen, an indication of the one or more predefined functions of the application associated with the first icon. In block 508, the method 500 includes receiving, by the computing device, an indication of a second gesture input indicating a selection of at least one of the one or more predefined functions of the application associated with the first icon. In block 510, the method 500 includes, responsive to the selection, executing the selected at least one of the one or more predefined functions without outputting, for presentation, the respective primary application user interface for the application associated with the first icon.

According to additional example implementations, outputting information at the application selection screen, based on detecting the first gesture input, may include presenting a default subset of selectable functions associated with the application. Additional implementations of the disclosed technology can include detecting a second gesture input at the first location, and hiding the information associated with one or more functions of the icon's respective application, based on detection of the second gesture input. For example, if the first gesture input is an "up swipe," the second gesture input may include a "down swipe." In certain implementations, the second gesture may include a simple gesture outside of the widget drawer, such as a tap, to hide the widget drawer from view.

In certain implementations, a presence-sensitive display may be utilized for receiving gesture inputs. According to certain example implementations of the disclosed technology, the presence-sensitive display may include one or more of a video camera, a capacitive sensor, an inductive sensor, a proximity sensor, and/or a touch screen. In certain implementations, detecting the first and/or second gesture may include detecting a directional swipe on the touch screen.

According to certain example implementations, a widget may be utilized to access one or more functions associated with an application without requiring the application to open. Certain example implementations may include presenting a default subset of selectable functions associated with the application. In an example implementation, each of the selectable functions associated with the application may be presented in one or more predefined panes on the display. Certain example implementations may include detecting a third gesture input. Based on detecting the third gesture input, certain implementations may output, at the application selection screen, an additional (or different) subset of the selectable functions. In this regard, widgets, functions, etc., may be grouped or nested under categories and may be accessed directly from the widget drawer by selection via additional gestures, for example, tapping.

According to an example implementation, certain technical effects can be provided, such as creating certain systems and methods that provide enhanced and efficient access to functions associated with applications. An example implementation of the disclosed technology can provide the further technical effects of providing systems and methods that allow a user to access cells of data, one or more labels, one or more selectable regions, one or more widgets, one or more functions, etc., associated with an application without having to fully open the application or leave the current application selection or home screen environment.

In an example implementation of the disclosed technology, the mobile device computing system architecture 300 may include any number of hardware and/or software applications that are executed to facilitate any of the operations. In an example implementation, one or more I/O interfaces may facilitate communication between the mobile device computing system architecture 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the mobile device computing system architecture 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the mobile device computing system architecture 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, a proximity network, etc., for communication with external devices and/or systems. As desired, implementations of the disclosed technology may include the mobile device computing system architecture 300 with more or less of the components illustrated in FIG. 3.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   outputting, by a computing device, and for presentation, an application selection screen, the application selection screen including one or more icons, each icon associated with a respective application, each respective application associated with a respective primary application user interface for the respective application;
   receiving, by the computing device, an indication of a first gesture input entered at a first location of a presence-sensitive display, the first location being associated with a first icon from the one or more icons;
   responsive to determining that the first gesture input is a tap gesture, outputting, by the computing device and for presentation, the respective primary application user interface for the application associated with the first icon; and
   responsive to determining that the first gesture input is a directional swipe gesture:
      outputting, by the computing device and for presentation within the application selection screen, an indication of the one or more predefined functions of the application associated with the first icon without outputting, for presentation, the respective primary application user interface for the application associated with the first icon, the indication of the one or more predefined functions overlaying at least one of the one or more icons;
      receiving, by the computing device, an indication of a second gesture input indicating a selection of at least one of the one or more predefined functions of the application associated with the first icon; and
      responsive to the selection, executing the selected at least one of the one or more predefined functions without outputting, for presentation, the respective primary application user interface for the application associated with the first icon.

2. The method of claim 1, further comprising:
   receiving, by the mobile computing device, an indication of a third gesture input associated with the first icon; and
   responsive to detecting the indication of the third gesture input, hiding the indication of the one or more predefined functions.

3. The method of claim 1, wherein the presence-sensitive display comprises a touch screen.

4. The method of claim 1, wherein the presence-sensitive display is attached to the computing device.

5. The method of claim 1, wherein outputting the indication of the one or more predefined functions comprises presenting a first subset of selectable functions associated with the application.

6. The method of claim 5, wherein each of the selectable functions associated with the application are presented in one or more predefined panes on the presence-sensitive display.

7. The method of claim 5, further comprising:
   detecting a fourth gesture input; and
   responsive to detecting the fourth gesture input, outputting, at the application selection screen, a second subset of selectable functions.

8. A system comprising:
   a presence-sensitive display;
   one or more processors in communication with the presence-sensitive display; and
   at least one memory in communication with the one or more processors and configured for storing data and instructions that, when executed by the at least one processor, cause the system to:
      output, for presentation, an application selection screen, the application selection screen including one or more icons, each icon associated with a respective application, each respective application associated with a respective primary application user interface for the respective application;

receive an indication of a first gesture input entered at a first location of a presence-sensitive display, the first location being associated with a first icon from the one or more icons;

responsive to determining that the first gesture input is a tap gesture, output, by the computing device and for presentation, the respective primary application user interface for the application associated with the first icon; and responsive to determining that the first gesture input is a directional swipe gesture:

output, for presentation within the application selection screen, an indication of the one or more predefined functions of the application associated with the first icon without outputting, for presentation, the respective primary application user interface for the application associated with the first icon, the indication of the one or more predefined functions overlaying at least one of the one or more icons;

receive an indication of a second gesture input indicating a selection of at least one of the one or more predefined functions of the application associated with the first icon; and responsive to the selection, execute the selected at least one of the one or more predefined functions without outputting, for presentation, the respective primary application user interface for the application associated with the first icon.

9. The system of claim 8, wherein the instructions, when executed by the at least one processor, further enable the system to:

receive an indication of a third gesture input associated with the first icon; and responsive to detecting the indication of the third gesture input, hide the indication of the one or more predefined functions.

10. The system of claim 8, wherein the presence-sensitive display comprises a touch screen.

11. The system of claim 8, further comprising a remote display in communication with the one or more processors and wherein the remote display is configured to output, for presentation, the indication of the one or more predefined functions.

12. The system of claim 8, wherein the indication comprises a first subset of selectable functions associated with the application.

13. The system of claim 12, wherein each of the first set of selectable functions associated with the application are presented in one or more predefined panes on the presence-sensitive display.

14. The system of claim 12, wherein the instructions, when executed by the at least one processor, further enable the system to:

detect a fourth gesture input; and based on the fourth gesture input, output, at the application selection screen, a second subset of the selectable functions.

15. A non-transitory computer-readable medium that stores instructions that, when executed by at least one processor in a system, cause the system to perform a method comprising:

outputting, by a computing device, and for presentation, an application selection screen, the application selection screen including one or more icons, each icon associated with a respective application, each respective application associated with a respective primary application user interface for the respective application;

receiving, by the computing device, an indication of a first gesture input entered at a first location of a presence-sensitive display, the first location being associated with a first icon from the one or more icons;

responsive to determining that the first gesture input is a tap gesture, outputting, by the computing device and for presentation, the respective primary application user interface for the application associated with the first icon; and responsive to determining that the first gesture input is a directional swipe gesture:

outputting, by the computing device and for presentation within the application selection screen, an indication of the one or more predefined functions of the application associated with the first icon without outputting, for presentation, the respective primary application user interface for the application associated with the first icon, the indication of the one or more predefined functions overlaying at least one of the one or more icons;

receiving, by the computing device, an indication of a second gesture input indicating a selection of at least one of the one or more predefined functions of the application associated with the first icon; and responsive to the selection, executing the selected at least one of the one or more predefined functions without outputting, for presentation, the respective primary application user interface for the application associated with the first icon.

16. The computer-readable medium of claim 15, that stores instructions that, when executed by at least one processor in a system, cause the system to perform a method further comprising:

receiving, by the mobile computing device, an indication of a third gesture input associated with the first icon; and responsive to detecting the indication of the third gesture input, hiding the indication of the one or more predefined functions.

17. The computer-readable medium of claim 15, wherein the presence-sensitive display comprises a touch screen.

18. The computer-readable medium of claim 15, wherein the presence-sensitive display is attached to the computing device.

19. The computer-readable medium of claim 15, wherein outputting the indication of the one or more predefined functions comprises presenting a first subset of selectable functions associated with the application.

20. The computer-readable medium of claim 19, wherein each of the selectable functions associated with the application are presented in one or more predefined panes on the presence-sensitive display.

21. The computer-readable medium of claim 19, that stores instructions that, when executed by at least one processor in a system, cause the system to perform a method further comprising:

detecting a fourth gesture input; and responsive to detecting the fourth gesture input, outputting, at the application selection screen, a second subset of selectable functions.

* * * * *